United States Patent
Schmit

(10) Patent No.: US 9,083,478 B2
(45) Date of Patent: Jul. 14, 2015

(54) APPARATUS AND METHODS FOR DETERMINING LATENCY OF A NETWORK PORT

(71) Applicant: Herman Schmit, Palo Alto, CA (US)

(72) Inventor: Herman Schmit, Palo Alto, CA (US)

(73) Assignee: Altera Corporation, San Jose, CA (US)

(*) Notice: Subject to any disclaimer, the term of this patent is extended or adjusted under 35 U.S.C. 154(b) by 480 days.

(21) Appl. No.: 13/624,150

(22) Filed: Sep. 21, 2012

(65) Prior Publication Data

US 2014/0089720 A1 Mar. 27, 2014

(51) Int. Cl.

| | |
|---|---|
| *G06F 1/06* | (2006.01) |
| *H04J 3/06* | (2006.01) |
| *G06F 13/42* | (2006.01) |
| *H04L 12/26* | (2006.01) |
| *H04L 7/00* | (2006.01) |

(52) U.S. Cl.
CPC .............. *H04J 3/0697* (2013.01); *G06F 13/42* (2013.01); *H04L 7/005* (2013.01); *H04L 12/26* (2013.01); *H04J 3/0667* (2013.01)

(58) Field of Classification Search
CPC ......... G06F 13/42; H04L 7/005; H04L 12/26; H04J 3/0697; H04J 3/0667
See application file for complete search history.

(56) References Cited

U.S. PATENT DOCUMENTS

| | | | |
|---|---|---|---|
| 6,990,597 B2* | 1/2006 | Abe et al. ................. | 713/500 |
| 2002/0047738 A1* | 4/2002 | Kamihara ................. | 327/237 |

OTHER PUBLICATIONS

IEEE Standard for a Precision Clock Synchronization Protocol for Networked Measurement and Control Systems, Jul. 24, 2008, 289 pages, IEEE Std 1588-2008 (Revision of IEEE Std 1588-2002).
Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.

* cited by examiner

*Primary Examiner* — Thuan Du
(74) *Attorney, Agent, or Firm* — Okamoto & Benedicto LLP

(57) ABSTRACT

One embodiment relates to a method for determining a latency of a network port. Read and write pointers for a FIFO are sampled at the same time. An average difference between a plurality of samples of the read and write pointers is determined. Another embodiment relates to an apparatus for providing timestamps to packets at a network port. Registers sample read and write pointers of a FIFO using a sampling clock. Logic circuitry determines an average difference between the read and write pointers, and timestamping circuitry receives the average difference and inserts timestamps into packets. Other embodiments and features are also disclosed.

24 Claims, 8 Drawing Sheets

APPARATUS AND METHODS FOR DETERMINING LATENCY OF A NETWORK PORT

BACKGROUND

1. Technical Field

The present invention relates generally to data communications.

2. Description of the Background Art

Timestamping protocols, such as the IEEE-1588 standard, for example, may be used to synchronize clocks across a data network to very high precision. However, the limit of the synchronization accuracy depends on the accuracy of the timestamps placed on packets entering and leaving the network port.

Hence, in order to generate the timestamps, it is necessary to estimate the latency of circuit structures in the data path within the transceiver. For high-speed transceiver channels, estimating the latency with sufficient accuracy for timestamping packets under a protocol such as IEEE-1588 is a challenging task.

SUMMARY

One embodiment relates to a method for determining a latency of a network port. Read and write pointers for a FIFO are sampled at the same time. An average difference between a plurality of samples of the read and write pointers is determined.

Another embodiment relates to an apparatus for providing timestamps to packets at a network port. Registers sample read and write pointers of a FIFO using a sampling clock. Logic circuitry determines an average difference between the read and write pointers, and timestamping circuitry receives the average difference and inserts timestamps into packets.

Another embodiment relates to a serial interface circuit which includes a transmission FIFO buffer for receiving a parallel data signal in a first clock domain and outputting the parallel data signal in a second clock domain, a transmission gearbox for converting the parallel data signal from a first width to a second width, and a serializer for converting the parallel data signal having the second width in bits to a serial data signal. The serial interface circuit further includes first and second registers for sampling read and write pointers for the transmission FIFO buffer using a sampling clock, logic circuitry for determining an average difference between the read pointer and the write pointer, and timestamping circuitry for receiving the average difference and inserting time stamps into the parallel data signal in the first clock domain.

Another embodiment relates to a serial interface circuit which includes a deserializer for receiving a serial data signal and converting the serial data signal into a parallel data signal, a receiver gearbox for converting the parallel data signal from a first width to a second width, and a receiver FIFO buffer for receiving the parallel data signal in a first clock domain and outputting the parallel data signal in a second clock domain. The serial interface circuit further includes first and second registers for sampling a read pointer for the receiver FIFO buffer using a sampling clock, logic circuitry for determining an average difference between the read pointer and the write pointer, and timestamping circuitry for receiving the average difference and inserting time stamps into the parallel data signal in the second clock domain.

Other embodiments and features are also disclosed.

DETAILED DESCRIPTION

One technique for providing high precision timestamps involves running a very high-frequency counter near the actual serial transmitters and receivers of the network port. The counter values may then be captured as the packets leave or arrive at the port.

Unfortunately, using such a high-frequency counter is costly in terms of circuit resources and requires frequencies that may be difficult to achieve in practice for parallel digital circuits. Furthermore, some protocols (such as recent additions to the IEEE-1588 standard) may require that a high-precision timestamp be placed within the very packet that is being transmitted. In this case, the timestamp must be acquired with high-accuracy inside the media access control (MAC) circuitry, which generally operates at a much slower frequency than the serial transmission circuitry.

Another technique for providing high-precision timestamps may be to provide constant latency in the path from the MAC circuitry to the serial pin. However, when multiple clock domains are present in this path, providing constant latency is not feasible.

The present disclosure provides structures and methods to precisely estimate latency in a network port. These structures and methods are capable of estimating the latency to an inaccuracy that is less than (i.e. to an accuracy that is better than) the period for the hardware that is sampling data and computing the estimation. These structures and methods may be applied, for example, to the problem of timestamping packets under IEEE-1588. In one particular implementation, the disclosed structures and methods may be used to achieve a theoretical accuracy of 200 picoseconds for 10 Gb Ethernet, while running on hardware that operates with a period of 6.4 nanoseconds.

Figure 1:
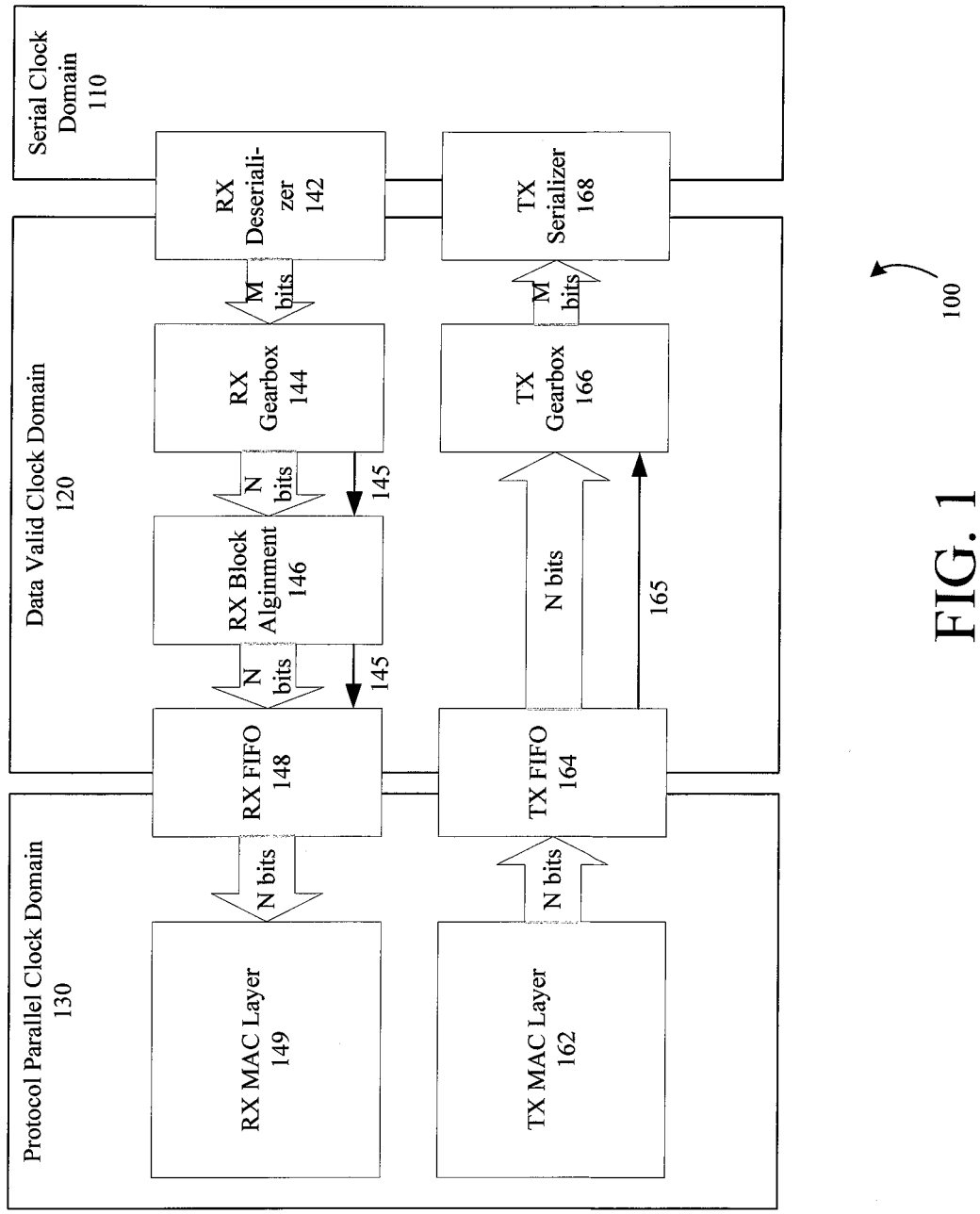
FIG. 1 depicts a transceiver within which an embodiment of the invention may be implemented.

Consider, for example, the multiple clock domains in the transceiver circuitry depicted in FIG. 1. As shown, the multiple clock domains may include a serial clock domain 110, a data valid (intermediate) clock domain 120, and a protocol parallel clock domain 130. In one example, the serial clock domain 110 may have a clock frequency of 10.3 gigahertz (GHz), the data valid clock domain 120 may have a clock frequency of 258 megahertz (MHz), and the protocol parallel clock domain may have a clock frequency of 156 MHz. In other implementations, the clock domains may have other clock frequencies.

In the receiver (RX) path, the RX deserializer circuit 142 converts the serial bitstream in the serial clock domain 110 to an M-bit-wide parallel bitstream in the data valid clock domain 120. The RX (M-to-N) gearbox circuit 144 converts the M-bit word to an N-bit word, where N is greater than M. For example, M may be forty, and N may be sixty-six. M and N may be other numbers in other implementations.

Since N is greater than M, the RX gearbox circuit 144 does not have enough data bandwidth coming in to provide a wider word (N-bits wide) every cycle. As such, the RX gearbox circuit 144 also outputs a data valid signal 145. For the M-to-N gearbox 144, the data valid signal 145 is asserted M times in a cycle of N clock periods. In other words, during a period of N clock cycles, the data valid signal is asserted during M clock cycles and de-asserted during (N-M) clock cycles. For example, if M=40 and N=66, then the RX 40-66 gearbox, and the data valid signal 145 is asserted twenty times in a cycle of thirty-three clock periods.

The RX block alignment circuit 146 determines the block boundaries and aligns the received data to those block boundaries. The block boundary may be determined, for example, by searching for a multi-bit header for an N-bit block. The aligned N-bit blocks are transferred to the RX FIFO (first-in first-out) buffer 148. The RX block alignment circuit 146 also passes the data valid signal 145 to the RX FIFO buffer 148, where the data at the higher clock rate is moved to a lower frequency (the serial rate divided by the protocol's data width) without a valid signal (i.e. with the data being valid every clock cycle).

The RX FIFO buffer 148 serves as a clock-crossing bridge from the data valid clock domain 120 to the protocol parallel clock domain 130. The RX FIFO buffer 148 may have a depth of $D_R$ blocks. For example, the depth may be sixteen blocks (i.e. $D_R$=16). Other depths may be implemented.

The RX MAC circuitry 149 operates in the protocol parallel clock domain 130. The RX MAC circuitry 149 receives the N-bit-wide data blocks (words) output by the RX FIFO 148 and processes the received data in accordance with MAC layer requirements.

In the transmit (TX) path, the TX MAC circuitry 162 operates in the protocol parallel clock domain 130. The TX MAC circuitry 162 processes the data to be transmitted in accordance with MAC layer requirements and provides the N-bit data blocks to the TX FIFO buffer 164.

The TX FIFO buffer 164 serves as a clock-crossing bridge from the protocol parallel clock domain 130 to the data valid clock domain 120. The TX FIFO buffer 164 may have a depth of $D_T$ blocks. For example, the depth may be sixteen blocks (i.e. $D_T$=16). Other depths may be implemented.

Upon assertion of a data valid signal 165, the TX (N-to-M) gearbox circuit 166 may receive the N-bit word and convert it to an M-bit word, where N is greater than M as discussed above in relation to the RX gearbox circuit 144. The TX serializer circuit 168 converts the M-bit-wide parallel bitstream in the data valid clock domain 120 to a serial bitstream in the serial clock domain 110.

The data valid clock domain 120 and the protocol parallel clock domain 130 in the transceiver 100 of FIG. 1 may be considered to have, for practical purposes, arbitrary phase relationships. The clock signals for the different domains are distributed within the integrated circuit differently and may have substantially different clock insertion delays due to process-voltage-temperature (PVT) variations. For this reason, these clock domains are crossed with FIFO buffers (148 and 164). The FIFO buffers may move data across the domains regardless of phase, but the FIFO buffers introduce nondeterministic latencies into the transmit and receive paths. Without a determination of those latencies, the capability to accurately timestamp outgoing and incoming packets is substantially limited.

Consider, for example, the timestamping protocol of IEEE-1588. According to the definition of IEEE-1588, timestamps should be measured as the first bit of a packet, after the frame delimiter, enters or leaves the chip. Practical applications may require precision in the neighborhood of hundreds of picoseconds. In a practical system with current technology, this level of precision is more precise than the clock period in the data valid clock domain 120 and the protocol parallel clock domain 130 and requires accounting for the behavior of the serializer and deserializer (SERDES) circuits (142 and 168).

The present disclosure provides structures and methods to estimate the precise latency of a FIFO buffer. When combined with a compatible design of the remaining digital (physical coding sublayer) and analog (physical media attachment) circuitry in the transceiver paths, these structures and methods may be used to provide extremely accurate latency estimations for use in timestamping techniques, such as IEEE-1588, for example. A compatible design of the remaining path circuitry should generally not have any other storage that is variably determined by the semi-random boot state of the system. If there is variable storage in the remaining path circuitry, then it must be visible and accounted for in the latency computation.

The present disclosure considers two types of FIFO buffers: a first type of FIFO with read and write clocks that have the same nominal frequency, but where the phase relationship is unknown and/or slowly varying; and a second type of FIFO that is used in tandem with a gearbox to transfer data at one frequency and width to another frequency and width.

For the first type of FIFO, where the write and read ports of the FIFO run at the same frequency, then the occupancy of the FIFO (and therefore the latency of the FIFO) is a function of the phase of the two clocks. For example, consider the two scenarios depicted in FIGS. 2A and 2B for the first type of FIFO.

Figure 2A:
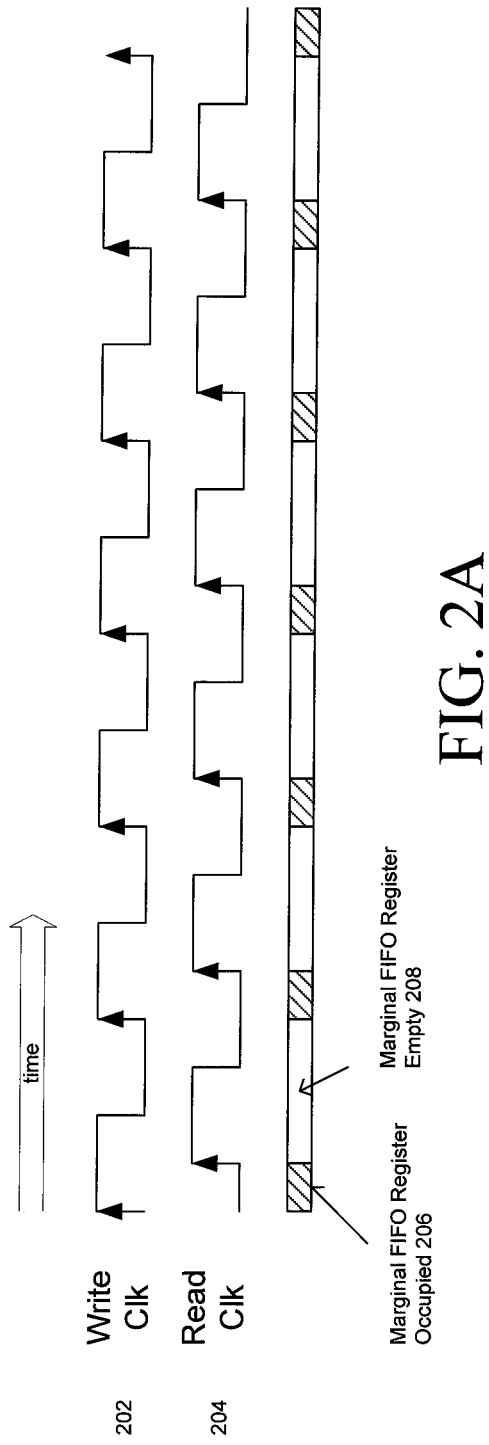
FIG. 2A is a timing diagram showing a first example phase relationship between read and write clocks in accordance with an embodiment of the invention.

In the first scenario which is depicted in FIG. 2A, the read clock edge used for triggering in the read clock 204 is very shortly after the edge used for triggering in the write clock 202. In contrast, in the second scenario which is depicted in FIG. 2B, the read clock edge used for triggering in the read clock 214 is very shortly before the next edge used for triggering in the write clock 212.

Figure 2B:
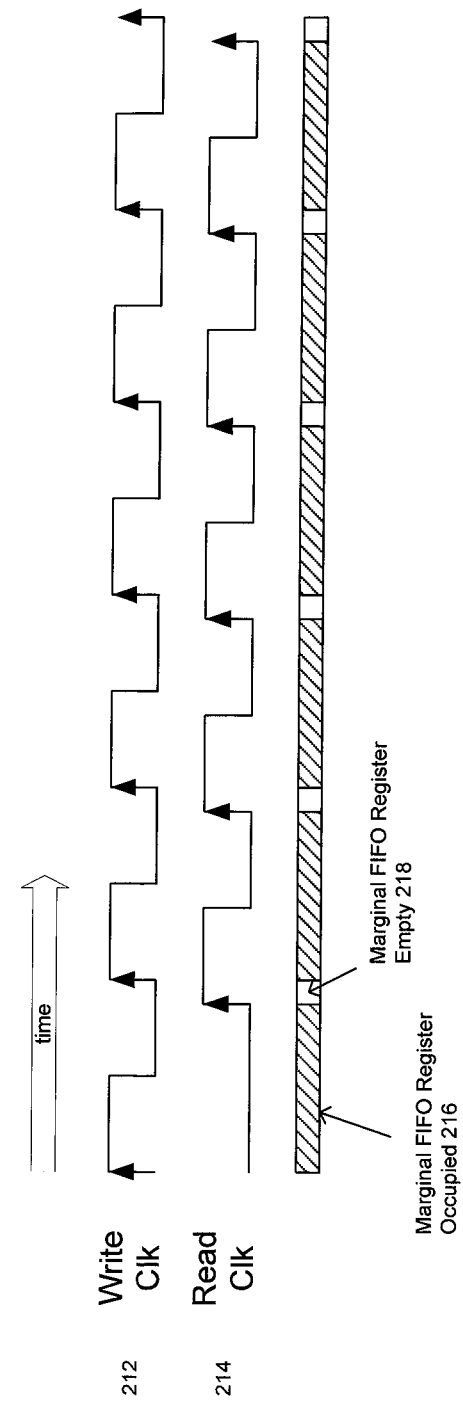
FIG. 2B is a timing diagram showing a second example phase relationship between read and write clocks in accordance with an embodiment of the invention.

All else being equal, due to the different phase relationships between write and read edges, the latency of the FIFO in FIG. 2A would be expected to be shorter than the latency of the FIFO in FIG. 2B. In more general terms, the latency of a FIFO depends on the phase relationship between the write and read clocks.

Unfortunately, it is problematic to directly obtain information about the phase relationship between the write and read clocks. This is because the marginal FIFO register generally becomes occupied at the write edge and empty at the read edge. In other words, there is generally no phase information provided by the circuitry about the phase relationship between the clocks at the actual read or write edges.

Circumventing the Need to Directly Measure the Phase Relationship

Fortunately, the present disclosure provides advantageous technique to circumvent the need to obtain direct information about the phase relationship between the write and read clocks. In these techniques, the phase relationship is indirectly obtained by measuring the average occupancy of the FIFO.

One technique disclosed herein makes innovative use of a mathematical theorem referred to as Little's Law for purposes of estimating latencies in order to generate timestamps. Little's Law may be defined as follows:

In a store that is statistically stable over a relevant time period, the long-term average number of customers present in a store, C, is equal to the long-term average effective arrival rate of the customers, A, multiplied by the average time a customer spends waiting, W; or expressed algebraically: C=AW (Equation 1).

For purposes of a digital FIFO buffer, we can re-write this law as follows:

In a FIFO buffer which is statistically stable over a relevant time period, the long-term average FIFO occupancy in bits, O, is equal to the long-term average effective bit write frequency, F, multiplied by the average time lag of a bit due to the FIFO buffer, L; or expressed algebraically: O=FL (Equation 2).

In our case, we want to know the average time lag of a bit due to the FIFO buffer. According to the expression above, the average time lag of a bit due to the FIFO buffer, L, is equal to the long-term average FIFO occupancy in bits, O, divided by the long-term average effective bit write frequency, F; or expressed algebraically: L=O/F (Equation 3).

Consider again FIGS. 2A and 2B. Due to the phase relationship in the first scenario shown in FIG. 2A, the time periods 206 during which a marginal FIFO register is occupied is relatively short in comparison to the time periods 208 during which the marginal FIFO register is empty (unoccupied). In contrast, due to the phase relationship in the second scenario shown in FIG. 2B, the time periods 216 during which a marginal FIFO register is occupied is relatively long in comparison to the time periods 218 during which the marginal FIFO register is empty (unoccupied). Hence, in this case, the long-term average number of bits stored in the FIFO buffer is smaller in the first scenario (FIG. 2A) and is larger in the second scenario (FIG. 2B).

For example, consider that the FIFO buffer has five registers occupied with data words (with remaining registers in the FIFO being empty) during the time period (206 or 216) when the marginal register is occupied and has four registers occupied with data words (with remaining registers in the FIFO being empty) during the time period (208 or 218) when the marginal register is empty. The long-term average number of bits stored in the FIFO buffer would be a little over the number of bits in four words in the first scenario (FIG. 2A), while the long-term average number of bits stored in the FIFO buffer would be a little under the number of bits in five words in the second scenario (FIG. 2B).

Determining the Average Occupancy

There are at least two different techniques to determine the occupancy of the FIFO. A first technique involves a fast sample clock, while a second technique may use a slower sample clock and involves application of a variant of Little's Law. Both techniques may be applied to either the first type of FIFO (with read and write clocks having a same nominal frequency) or the second type of FIFO (used in tandem with a gearbox).

The first technique uses a very fast sample clock with period $P_{fast}$ which is many times shorter than the periods $P_{read}$ and $P_{write}$ of the FIFO read and write clocks, respectively. In other words, $P_{fast<<Pread}$ and $P_{fast<<Pwrite}$. In this first technique, the fast sample clock may be used to determine a real-time occupancy level of the FIFO buffer on every cycle. For example, if $P_{read}=P_{write}=10$ nanoseconds (ns) and $P_{fast}=100$ picoseconds (ps), then the fast sample clock would provide 100 samples per read or write cycle and so be able to determine the real-time occupancy of the FIFO to one percent of a word and, hence, the phase relationship between read and write clocks to one percent of a clock cycle. However, generating the fast sampling clock in this example is not very practical.

The second technique uses a slower sample clock with period $P_{slow}$ to sample the occupancy level of the FIFO buffer over a large number of cycles. The period $P_{slow}$ of the slower sample clock may be similar as, or longer than, the periods $P_{read}$ and $P_{write}$ of the FIFO read and write clocks, respectively. For example, if $P_{read}=P_{write}=10$ ns (corresponding to a frequency of 100 MHz) and $P_{slow}=10.1$ ns (corresponding to a frequency of 99 MHz), then the slow sample clock would provide an average occupancy of the FIFO to one percent of a word and, hence, the phase relationship between read and write clocks to one percent of a clock cycle. Generating the slow sampling clock in this example is much more feasible than generating the fast sampling clock in the previous example.

In the second technique, in order to obtain a good distribution of sampling points so as to achieve high-precision lag estimation, the greatest common divisor (GCD) of $P_{slow}$ and $P_{read}$ (and the GCD of $P_{slow}$ and $P_{write}$) should be very small. In the above example, given $P_{slow}=10.2$ ns (corresponding to a frequency of 98 MHz) and $P_{read}=P_{write}=10$ ns (corresponding to a frequency of 100 MHz), the GCD is 0.2 ns=200 picoseconds (ps). The nominal precision of the lag time estimation is thus 200 ps.

In another example, given $P_{slow}=9.9$ ns (corresponding to a frequency of 101 MHz) and $P_{read}=P_{write}=10$ ns (corresponding to a frequency of 100 MHz), the GCD is 0.1 ns=100 ps. The nominal precision of the lag time estimation is thus again 100 ps.

In yet another example, given $P_{slow}=99.9$ ns (corresponding to a frequency of 10.01 MHz) and $P_{read}=P_{write}=10$ ns (corresponding to a frequency of 100 MHz), the GCD is 0.1 ns=100 ps. The nominal precision of the lag time estimation is thus again 100 ps.

In yet another example, given $P_{slow}=20.05$ ns (corresponding to a frequency of 48.78 MHz) and $P_{read}=P_{write}=10$ ns (corresponding to a frequency of 100 MHz), the GCD is 0.05 ns=50 ps. The nominal precision of the lag time estimation is thus 50 ps.

In yet another example, given $P_{slow}=4.016$ ns (corresponding to a frequency of 249 MHz) and $P_{read}=P_{write}=4$ ns (corresponding to a frequency of 250 MHz), the GCD is 0.016 ns=16 ps. The nominal precision of the lag time estimation is thus 16 ps.

While several hypothetical examples of sampling and read/write clocks for the second technique are given above, there are an unlimited number of such examples of sampling and read/write clocks that would work. In some examples, the sampling points may resemble random points within a nominal read/write period.

In the second technique using the slower clock, taking an average of the occupancy samples over a number of cycles will eventually converge on the correct average occupancy level. In contrast, the first technique using the fast clock obtains a real-time estimation of the average occupancy level in a single cycle. Thus, the second technique generally takes longer to estimate the FIFO lag than the first technique.

It is contemplated that the greatest common divisor between the clock period of the sampling clock and the clock periods of the read and write clocks will preferably be very small. If the greatest common divisor is not very small, then that common divisor will limit the precision of the second technique. For example, if the FIFO clock has a period of 8 ns and the sample clock has a period of 9 ns, the sampling average will not be able to distinguish the average occupancy to less than ⅛ of a FIFO period. Hence, as in the examples given above, the sampling clock period is preferably selected so as to have a very small greatest common divisor with the FIFO clock period. Although the precision of the technique will be limited, it is also contemplated that the greatest common divisor between the clock period of the sampling clock and the clock periods of the read and write clocks may be up to one-quarter, or even one-half, the clock periods of the read and write clocks.

In theory, the precision of the second technique may be near infinite if the sampling clock period and the FIFO clock period are "relatively prime" such that greatest common divisor is infinitesimal. However, in practice, ambiguity in the sampling window of registers will limit the precision of the averaging. This sampling window is approximately the sum of the setup time and the hold time. For example, the sampling window is approximately 100 ns in an integrated circuit fabricated in a 28 nm line-width silicon process. Furthermore, variability in the transceivers and in the transmission media (copper or fiber), as well as variability in other components in the communication path, will limit the ultimate precision of the timestamping.

Exemplary Circuit Apparatus and Method

Figure 3:
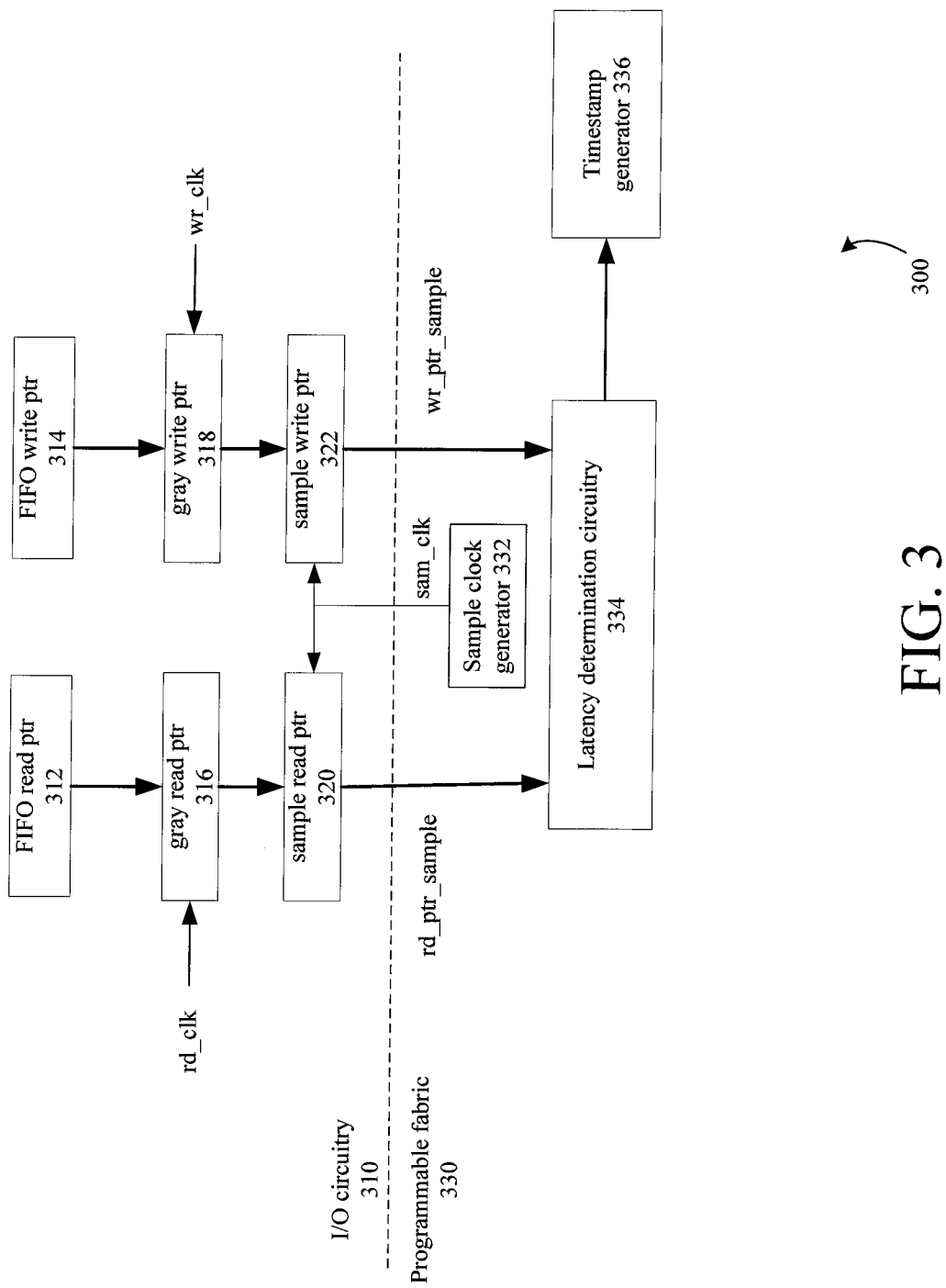
FIG. 3 is a circuit block diagram of an exemplary apparatus for determining latency of a network port in accordance with an embodiment of the invention.

FIG. 3 is a circuit block diagram of an exemplary apparatus 300 for determining latency of a network port in accordance with an embodiment of the invention. The apparatus 300 may be implemented on a single integrated circuit. As shown, the apparatus 300 may include components implemented in input/output (I/O) circuitry 310 and components implemented in a programmable fabric 330. The programmable fabric 330 may comprise, for example, a core of a field programmable gate array (FPGA) or other programmable logic device. Other implementations are also contemplated. For example, the components may be implemented fully in the I/O circuitry.

As shown in FIG. 3, the components in the I/O circuitry 310 may include a FIFO read-pointer register 312, a FIFO write-pointer register 314, a gray read-pointer register 316, a gray write-pointer register 318, a sample read-pointer register 320, and a sample write-pointer register 322. The components in the programmable fabric 330 may include a sample clock generator 332, latency determination circuitry 334, and a timestamp generator 336.

In the FIFO buffer, the read and write pointers are maintained as binary values in the FIFO read-pointer 312 and FIFO write-pointer 314 registers. These read and write pointers are converted to gray code in order to cross to the other clock domain. Hence, with timing based on the FIFO read clock (rd_clk), the pointer in the FIFO read-pointer register 312 is converted to gray code in the gray read-pointer register 316. Similarly, with timing based on the FIFO write clock (wr_clk), the pointer in the FIFO write-pointer register 314 is converted to gray code in the gray write-pointer register 318. The FIFO read and write clocks may operate at a same frequency or at different frequencies, depending on the design of the transceiver circuitry.

With timing based on the sample clock (sam_clk), the gray read pointer in the gray read pointer register 316 may be sampled, and the sampled value may be stored in the sample read-pointer register 320. Similarly, with timing also based on the sample clock (sam_clk), the gray write pointer in the gray write-pointer register 318 may be sampled, and the sampled value may be stored in the sample write-pointer register 322.

In accordance with an embodiment of the invention, the sample clock is used to sample both the read and write pointers at a same time. As depicted in FIG. 3, the sample clock may be generated by a sample clock generator 332 which may be configured in the programmable fabric 330. Alternatively, if the data valid clock domain 120 is self-contained within the I/O circuitry 310, then the sampling may be performed using the FIFO write clock (wr_clk), instead of a sampling clock generated in the programmable fabric 330.

The sample read and write pointers may be obtained by the latency determination circuitry 334. If the slower clock approach is used, then the latency determination circuitry 334 may be configured to determine an average difference between the sample read and write pointers. During stable operation, the average difference should converge onto an average difference value that corresponds to a latency for the FIFO buffer. The latency determination circuitry 334 may determine an estimate of the FIFO latency based on the average difference value. Configuring the latency determination circuitry 334 in the programmable fabric 330 provides greater flexibility in the implementation. For example, in some cases, a user may apply either the fast clock or the slow clock approach to estimate the latency of the FIFO.

A timestamp generator 325 in the programmable circuitry 310 may receive the latency data and use it, along with other data, to generate timestamps. The timestamps may be attached to a data packet being transmitted or may be placed in a separate control packet.

Figure 4A:
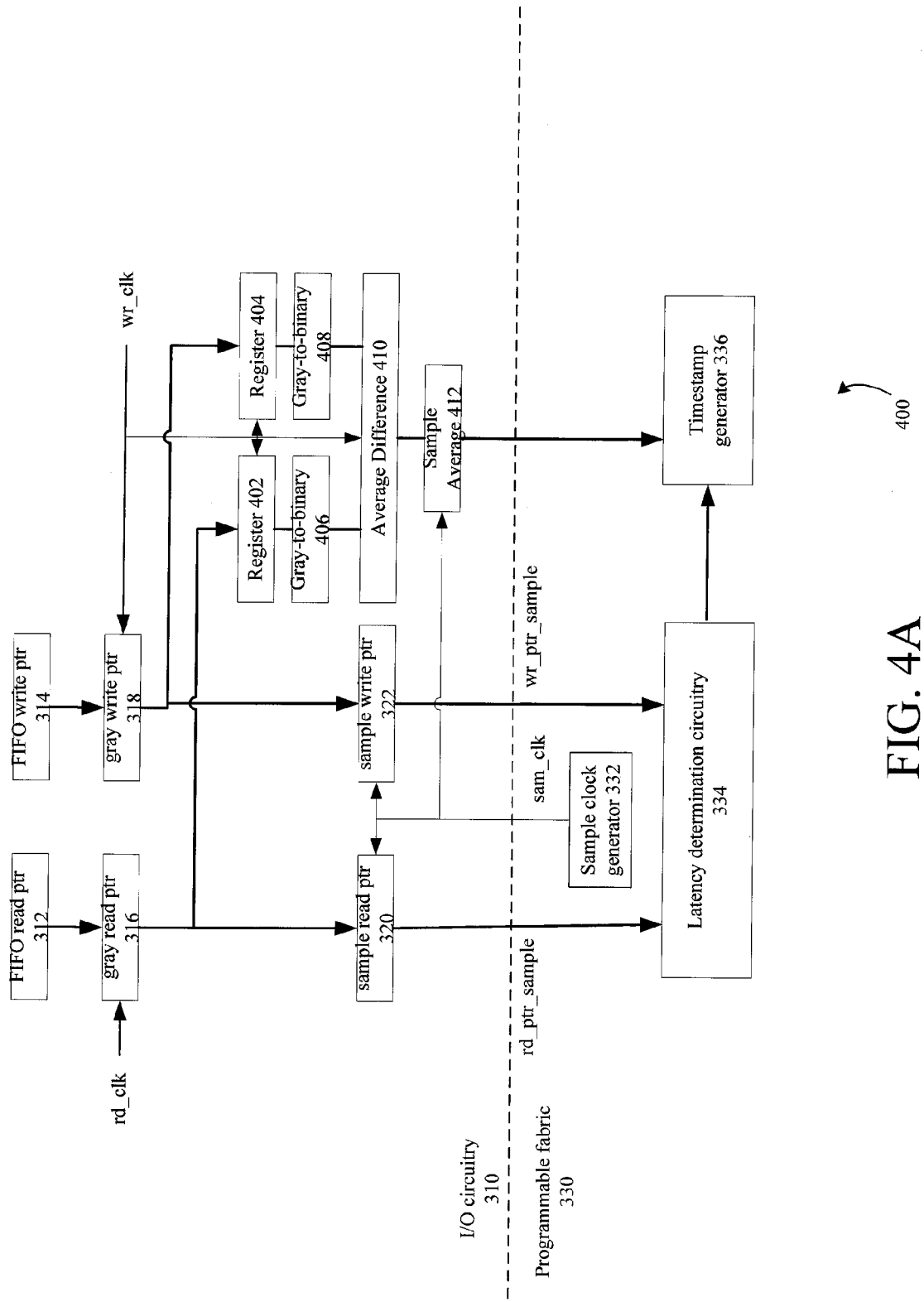
FIG. 4A is a circuit block diagram of an exemplary apparatus for determining latency of a RX FIFO of a network port in accordance with another embodiment of the invention.

FIG. 4A is a circuit block diagram of an exemplary apparatus 400 for determining latency of a RX FIFO of a network port in accordance with another embodiment of the invention. This embodiment is capable of generating latency information by two pathways.

The first pathway uses the circuitry described above in relation to FIG. 3. In particular, the sampled read and write pointers are provided from the sample registers (320 and 322) in the I/O circuitry 310 to the latency determination circuitry 334 in the programmable fabric 330. If a slower sample clock is used as in the second technique discussed above, then the latency determination circuitry 334 may then determine an average difference of the sampled read and write pointers to estimate the FIFO latency. The average difference information may then be provided to the timestamp generator 336.

The second pathway performs both sampling and averaging in the I/O circuitry 310. This may be accomplished using uses two sampling registers (402 and 404), two gray-to-binary converters (406 and 408), an average difference computation circuit 410, and a sample average register 412. In this pathway, the data valid clock may be assumed to be the write clock (wr_clk). The average in this structure should be relatively stable, thus allowing the domain crossing into a user design clock frequency with minimal error. The averaging mechanism may perform a running average of a sufficient number of samples to capture one complete iteration of the gearbox cycle. The average difference information may then be provided to the timestamp generator 336.

It is contemplated that, in addition, the data valid clock rate can also be used to average the occupancy of the FIFO. The data valid clock period does not have a small greatest common divisor with itself, and therefore there is no guarantee that the average occupancy will match the actual occupancy. Due to the periodicity of the data valid signal, however, the difference between the actual average occupancy and the measured average occupancy (at the data valid clock rate) is constant. In the case of the 40-bit deserializer, the average FIFO depth is inaccurate by 19.5 bits. This constant error can be easily corrected within the latency computation circuits or the software that converts the occupancy data to latency estimations. This is true for both 66-40, 66-64, 67-40 and 66-64 gearbox/FIFO combinations.

Figure 4B:
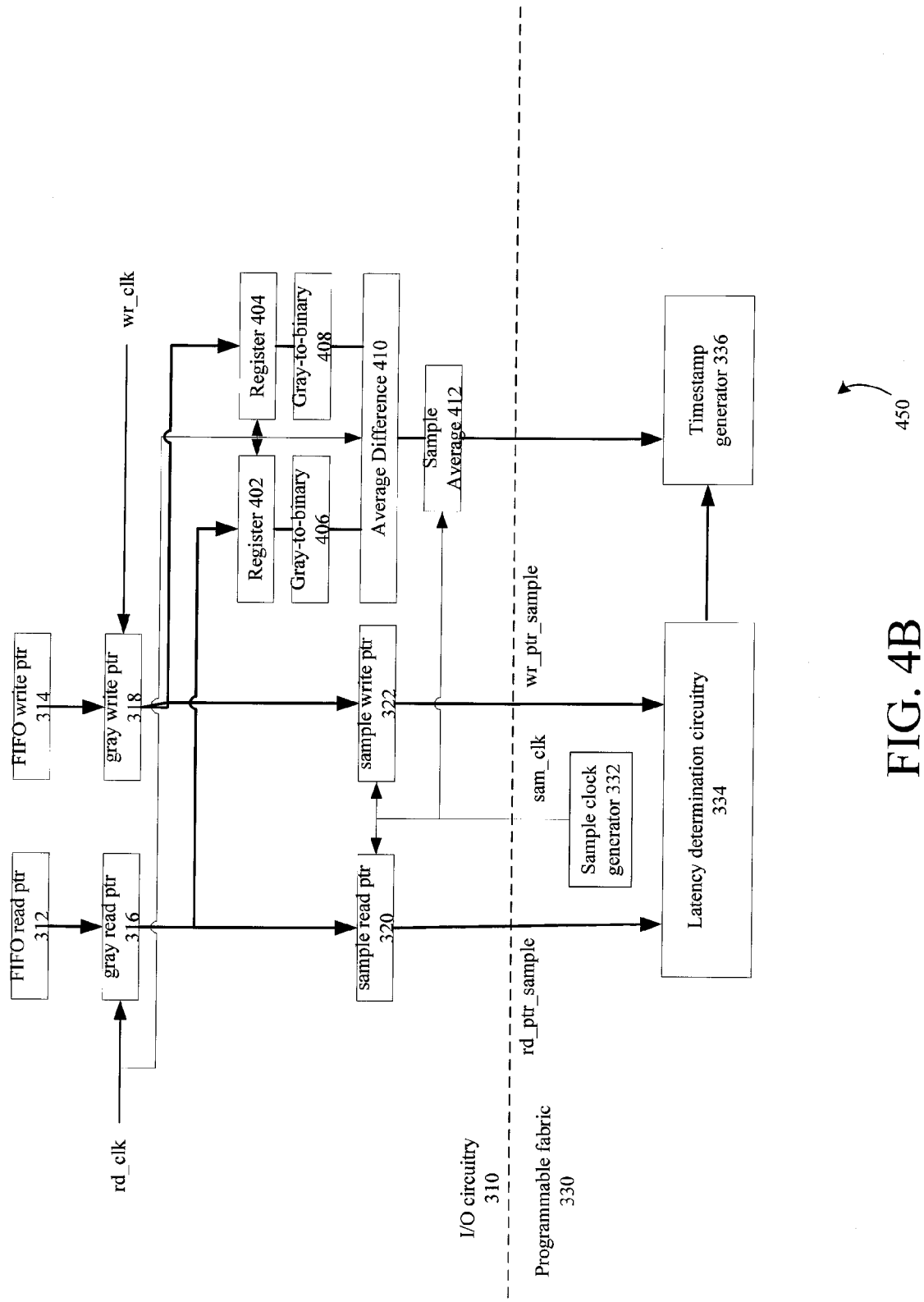
FIG. 4B is a circuit block diagram of an exemplary apparatus for determining latency of a TX FIFO of a network port in accordance with another embodiment of the invention.

FIG. 4B is a circuit block diagram of an exemplary apparatus 450 for determining latency of a TX FIFO of a network port in accordance with another embodiment of the invention. In contrast to FIG. 4A, the FIFO read clock (rd_clk) is used to perform the sampling into registers 402 and 404 in FIG. 4B.

Figure 5:
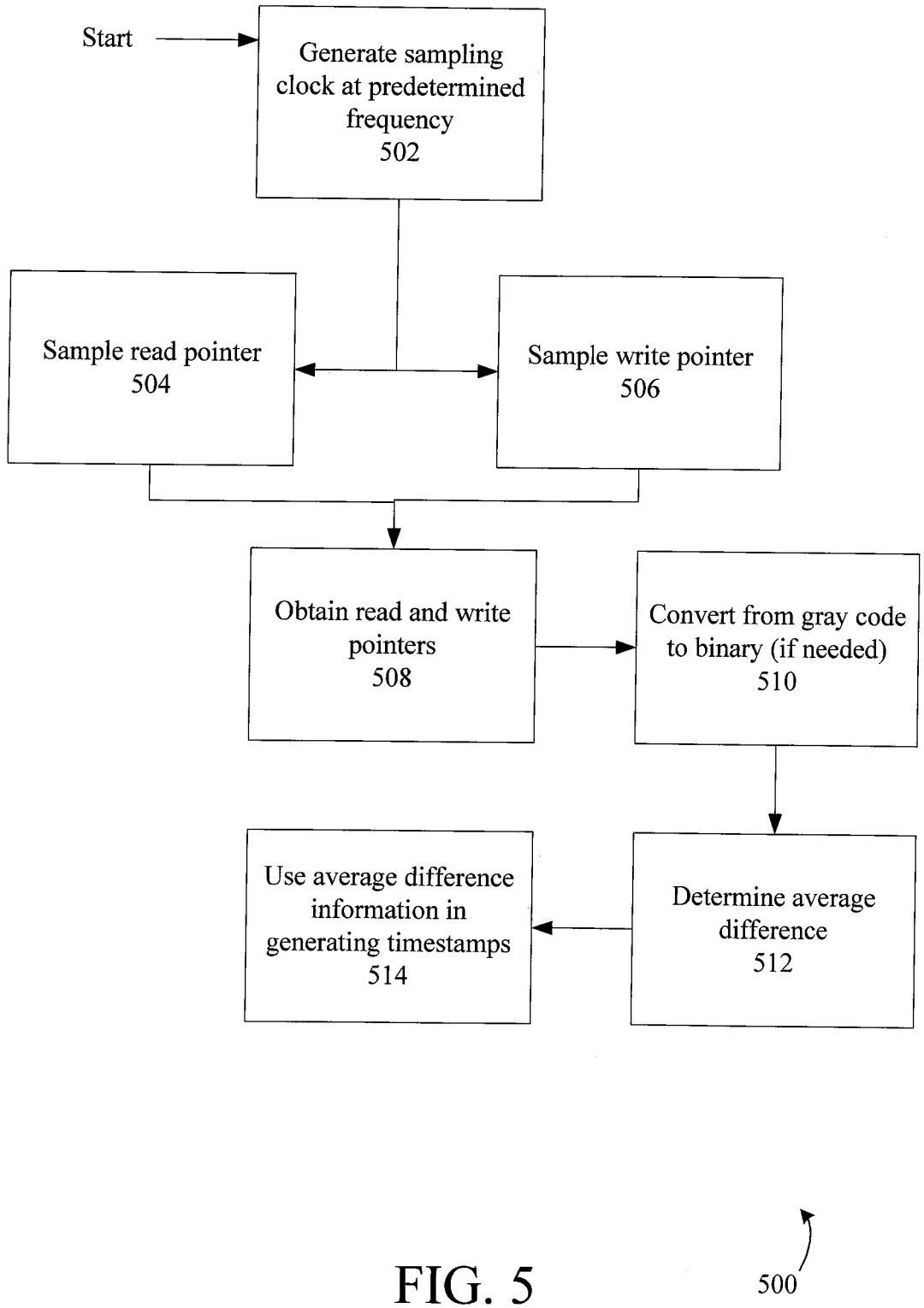
FIG. 5 is a flow chart of an exemplary method for determining latency of a network port with a FIFO in accordance with an embodiment of the invention.

FIG. 5 is a flow chart of an exemplary method 500 for determining latency of a network port with a FIFO in accordance with an embodiment of the invention. Per block 502, a sampling clock may be generated at a predetermined frequency. The sampling clock may be fast or slower per the first and second techniques discussed above.

The read pointer is sampled per block 504, and the write pointer is sampled per block 506. The sampling clock is used so that the read and write pointers are sampled at a same time. This sampling may be performed for multiple clock cycles of the sampling clock so as to obtain a large number of samples of the read and write pointers.

The sampled read and write pointers are obtained per block 508. If the read and write pointers are in gray code, then they may be subsequently converted from gray code to binary in block 510.

Per block 512, an average difference between the sampled read and write pointers may be determined. The averaging may be performed over a sufficiently large number of samples so as to achieve convergence of the average difference value.

Per block 514, the average difference information may be used, along with other time-related information, to generate timestamps. If the FIFO is a transmission FIFO, then the timestamps may be inserted in packets outgoing from the network port. If the FIFO is a receiver FIFO, then the timestamps may be inserted in packets incoming to the network port.

Figure 6:
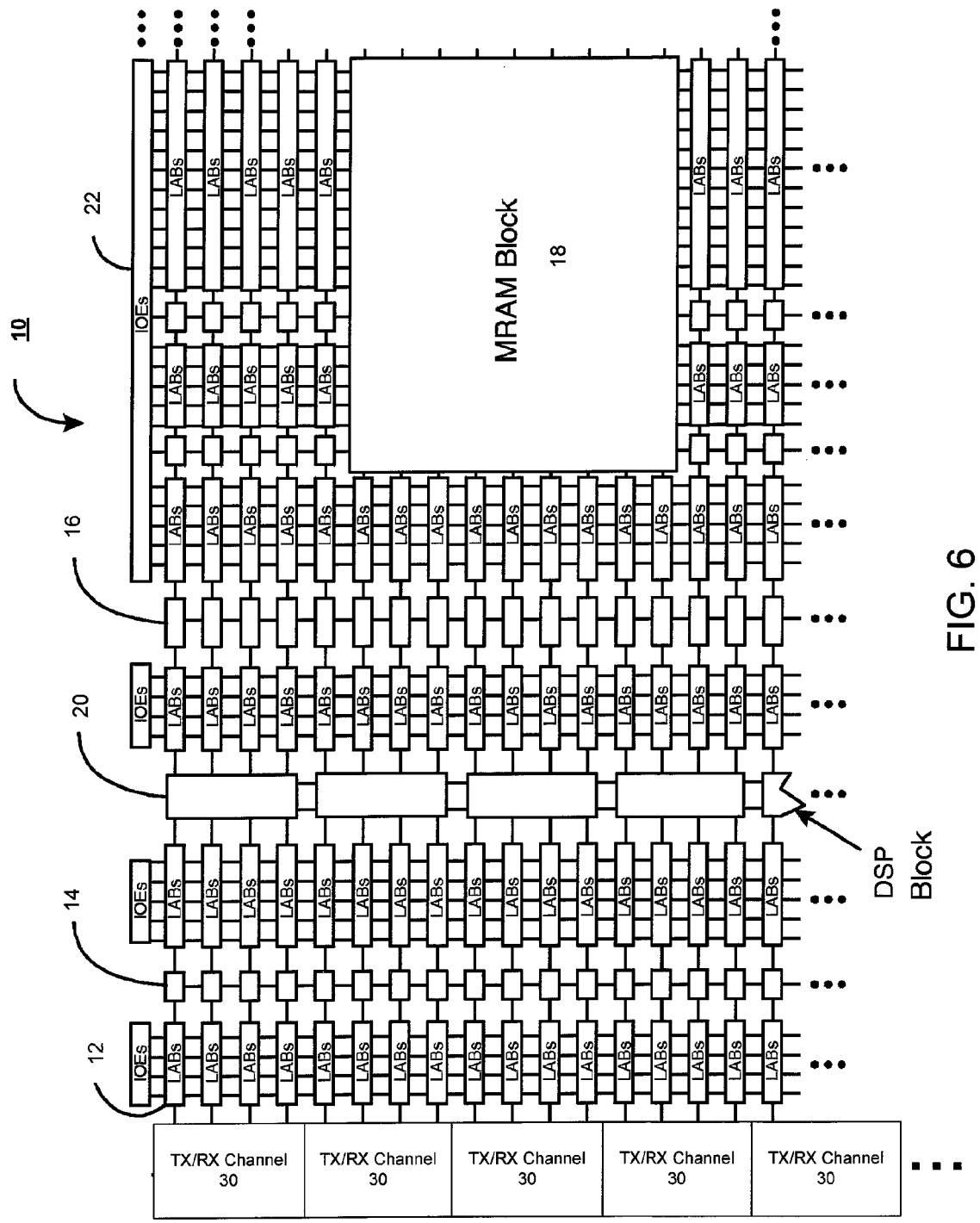
FIG. 6 is a simplified partial block diagram of a field programmable gate array (FPGA) including transceiver circuits within which the apparatus and methods disclosed herein may be implemented in accordance with an embodiment of the invention.

FIG. 6 is a simplified partial block diagram of a field programmable gate array (FPGA) 10 including transceiver circuits within which the apparatus and methods disclosed herein may be implemented in accordance with an embodiment of the invention. It should be understood that embodiments of the present invention can be used in numerous types of integrated circuits such FPGAs, programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed.

LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the circuitry described herein.

It is to be understood that FPGA 10 is described herein for illustrative purposes only and that the present invention can be implemented in many different types of PLDs, FPGAs, and ASICs.

Figure 7:
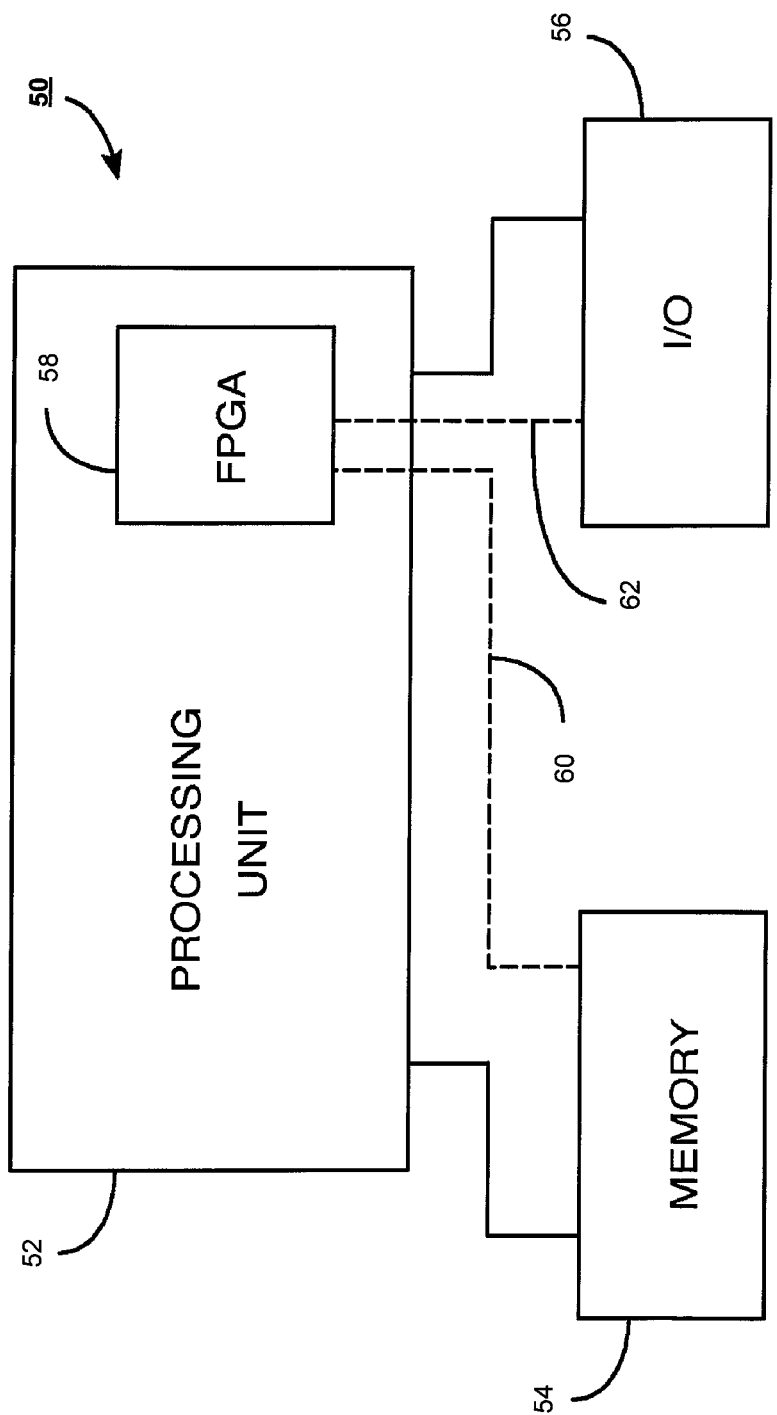
FIG. 7 is a block diagram of an exemplary digital system within which the apparatus and methods disclosed herein may be utilized in accordance with an embodiment of the invention.

The present invention can also be implemented in a system that has an FPGA as one of several components. FIG. 7 is a block diagram of an exemplary digital system 50 within which the apparatus and methods disclosed herein may be utilized in accordance with an embodiment of the invention.

System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for determining a latency of a network port, the method comprising:
    generating a sampling clock at a sampling frequency, wherein a clock period of the sampling clock is distinct from clock periods of read and write clocks of the FIFO buffer;
    sampling a read pointer for a first-in-first-out (FIFO) buffer using an edge of the sampling clock;
    sampling a write pointer for the FIFO buffer using the edge of the sampling clock;
    obtaining a plurality of samples of the read pointer and a plurality of samples of the write pointer; and
    determining an average difference between the plurality of samples of the read and write pointers.

2. The method of claim 1, wherein a greatest common divisor between the clock period of the sampling clock and the clock period of the read clock is less than one-half of the clock period of the read clock, and wherein a greatest common divisor between the clock period of the sampling clock and the clock period of the write clock is less than one-half of the clock period of the write clock.

3. The method of claim 1, wherein a greatest common divisor between the clock period of the sampling clock and the clock period of the read clock is less than one-fourth of the clock period of the read clock, and wherein a greatest common divisor between the clock period of the sampling clock and the clock period of the write clock is less than one-fourth of the clock period of the write clock.

4. The method of claim 3, wherein the sampling clock is slower than the read and write clocks.

5. The method of claim 1, wherein the read and write clocks have a same speed.

6. The method of claim 1, wherein the average difference is used in generating timestamps.

7. The method of claim 1, wherein the average difference is determined to a precision that corresponds to a lag time precision of 200 picoseconds or less.

8. An apparatus for providing timestamps to packets at a network port, the apparatus comprising:
    a sample clock generation circuit for generating a sampling clock;
    a first register for sampling a read pointer for a first-in first-out (FIFO) buffer of the network port using the sampling clock;
    a second register for sampling a write pointer for the FIFO buffer using the sampling clock;
    logic circuitry for determining an average difference between the read pointer and the write pointer; and
    timestamping circuitry for receiving the average difference and inserting timestamps into packets.

9. The apparatus of claim 8, wherein a greatest common divisor between the clock period of the sampling clock and the clock period of the read clock is less than one-half of the clock period of the read clock, and wherein a greatest common divisor between the clock period of the sampling clock and the clock period of the write clock is less than one-half of the clock period of the write clock.

10. The apparatus of claim 8, wherein a greatest common divisor between the clock period of the sampling clock and the clock period of the read clock is less than one-fourth of the clock period of the read clock, and wherein a greatest common divisor between the clock period of the sampling clock and the clock period of the write clock is less than one-fourth of the clock period of the write clock.

11. The apparatus of claim 10, wherein the sampling clock is slower than the read and write clocks.

12. The apparatus of claim 8, wherein the read and write clocks have a same speed.

13. The apparatus of claim 8, wherein the average difference is determined to a precision that corresponds to a lag time precision of 200 picoseconds or less.

14. The apparatus of claim 8, wherein the logic circuitry for determining the average difference is configured in programmable circuitry.

15. A serial interface circuit comprising:
    a transmission first-in first-out (FIFO) buffer for receiving a parallel data signal in a first clock domain and outputting the parallel data signal in a second clock domain;
    a transmission gearbox for converting the parallel data signal from a first width to a second width;
    a serializer for converting the parallel data signal having the second width in bits to a serial data signal;
    a first register for sampling a read pointer for the transmission FIFO buffer using a sampling clock;
    a second register for sampling a write pointer for the transmission FIFO buffer using the sampling clock;
    logic circuitry for determining an average difference between the read pointer and the write pointer; and
    timestamping circuitry for receiving the average difference and inserting time stamps into the parallel data signal in the first clock domain.

16. The serial interface circuit of claim 15, wherein a greatest common divisor between the clock period of the sampling clock and the clock period of the read clock is less than one-half of the clock period of the read clock, and wherein a greatest common divisor between the clock period of the sampling clock and the clock period of the write clock is less than one-half of the clock period of the write clock.

17. The serial interface circuit of claim 15, wherein the sampling clock is slower than the read and write clocks.

18. The serial interface circuit of claim 15, wherein the read and write clocks have a same speed.

19. The serial interface circuit of claim 15, wherein the average difference is determined to a precision that corresponds to a lag time precision of 200 picoseconds or less.

20. A serial interface circuit comprising:
    a deserializer for receiving a serial data signal and converting the serial data signal into a parallel data signal;
    a receiver gearbox for converting the parallel data signal from a first width to a second width;
    a receiver first-in first-out (FIFO) buffer for receiving the parallel data signal in a first clock domain and outputting the parallel data signal in a second clock domain;
    a first register for sampling a read pointer for the receiver FIFO buffer using a sampling clock;

a second register for sampling a write pointer for the receiver FIFO buffer using the sampling clock;
logic circuitry for determining an average difference between the read pointer and the write pointer; and
timestamping circuitry for receiving the average difference and inserting time stamps into the parallel data signal in the second clock domain.

21. The serial interface circuit of claim 20, wherein a greatest common divisor between the clock period of the sampling clock and the clock period of the read clock is less than one-half of the clock period of the read clock, and wherein a greatest common divisor between the clock period of the sampling clock and the clock period of the write clock is less than one-half of the clock period of the write clock.

22. The serial interface circuit of claim 20, wherein the sampling clock is slower than the read and write clocks.

23. The serial interface circuit of claim 20, wherein the read and write clocks have a same speed.

24. The serial interface circuit of claim 20, wherein the average difference is determined to a precision that corresponds to a lag time precision of 200 picoseconds or less.

* * * * *